UNITED STATES PATENT OFFICE.

WILLIAM A. HALL, OF BELLOWS FALLS, VERMONT.

PROCESS OF PRODUCING DRY CONDENSED MILK.

SPECIFICATION forming part of Letters Patent No. 694,100, dated February 25, 1902.

Application filed June 8, 1901. Serial No. 63,723. (No specimens.)

*To all whom it may concern:*

Be it known that I, WILLIAM A. HALL, a citizen of the United States, residing at Bellows Falls, in the county of Windham and State of Vermont, have invented or discovered certain new and useful Improvements in Processes of Producing Dry Condensed Milk, of which the following is a specification, reference being had therein to the accompanying drawings.

This invention or discovery has for its object to produce whole dry condensed milk, or, in other words, a dry milk product which will contain all of the elements or properties of fresh unskimmed milk minus the water therein.

Efforts have been made to produce whole dry condensed milk by evaporating fresh unskimmed milk; but, so far as I am aware, such efforts have not been commercially successful, for the reason that in the process of evaporation the butter-fat has a tendency to acquire a bitter and rancid taste, and dried condensed milk produced by the evaporation of unskimmed milk has an unpleasant flavor and is therefore not suitable for ordinary uses.

According to the present invention or discovery I remove the cream or fatty particles from the milk and then by evaporation reduce the skimmed milk to reduce it to a solid or dry condition in comminuted form, or I take the total solids of skimmed milk in dry form, produced by any suitable process of evaporation, and mix thoroughly therewith a suitable quantity of thick cream about equal in fatty matter to the cream originally in the milk, so that the mixture will have all the solid properties or elements of fresh or unskimmed milk. The cream which I prefer to use for this purpose will contain some forty per cent. to fifty per cent. of solid matter and fifty per cent. to sixty per cent. of water, although cream of different thickness than is indicated by these proportions may be employed. This heavy cream is mixed with the dry skimmed-milk solids, which are made up of casein, milk-albumen, sugar of milk, and salts of milk, and which dry solids are quite hygroscopic, so that they will readily absorb both the oil and water of which the cream is largely composed, each particle absorbing or taking up a portion of the oil and water. The water of the cream is then removed or evaporated from the mixture, preferably by exposing the latter to the air at a relatively low evaporation temperature, preferably at about 100° Fahrenheit, in thin layers, so that almost every particle of the milk solid containing the absorbed cream will be exposed in such a manner as to drive off the water by evaporation at the relatively low evaporation temperature referred to, leaving the oil or fatty matter and such milk solids as were contained in the cream and in the dry skimmed-milk product in a semigranular and comparatively dry condition.

It is known that the decomposition or putrefaction of milk is due to the presence of water with the casein and albumen and that the souring of milk is due to a change of the milk-sugar into lactic acid. It has been demonstrated that casein and milk albumen in a dry state will keep indefinitely and also that butter-oils will keep indefinitely if the water be extracted therefrom. It has also been demonstrated that the total solids of milk made by the above-described process of mixing cream with the skimmed-milk solids and then evaporating the water of the cream at a low evaporation temperature will keep indefinitely under ordinary atmospheric temperatures, and, in fact, such solids have already been kept for a year or more without decomposition or perceptible deterioration.

Having thus described my invention or discovery, I claim and desire to secure by Letters Patent—

1. The herein-described process for producing whole, dry, condensed milk, consisting in mixing a suitable proportion of cream with the dry solids of skimmed milk, and then eliminating the water of the cream from the mixture.

2. The herein-described process for producing whole, dry, condensed milk, consisting in mixing a suitable proportion of cream with the dry solids of skimmed milk, and then eliminating the water of the cream from the mixture by exposing the latter to air at a relatively low evaporation temperature, substantially as set forth.

3. The herein-described process for producing whole, dry condensed milk, consisting in removing the cream or fatty particles from the milk, evaporating the skimmed milk until a dry product is obtained, thoroughly mixing with such dry skimmed-milk product a suitable proportion of heavy cream approximately equal to the cream first removed from the milk, and then evaporating the water of the added cream from the mixture.

4. The herein-described process for producing whole, dry condensed milk, consisting in removing the cream or fatty particles from the milk, evaporating the skimmed milk until a dry product is obtained, thoroughly mixing with such dry skimmed-milk product a suitable proportion of heavy cream approximately equal to the cream first removed from the milk, and then evaporating the water of the added cream from the mixture by exposing the latter to air at a relatively low evaporation temperature, substantially as set forth.

In testimony whereof I affix my signature in presence of two witnesses.

WILLIAM A. HALL.

Witnesses:
   CHAS. E. MEEK,
   HENRY CALVER.